US012757038B2

(12) United States Patent
Barbu et al.

(10) Patent No.: US 12,757,038 B2
(45) Date of Patent: Oct. 6, 2026

(54) METHODS AND APPARATUSES FOR INTERNET OF THINGS

(71) Applicant: Nokia Technologies Oy, Espoo (FI)

(72) Inventors: Oana-Elena Barbu, Aalborg (DK); Benny Vejlgaard, Aalborg (DK); Johannes Harrebek, Aalborg (DK)

(73) Assignee: Nokia Technologies Oy, Espoo, FL (US)

( * ) Notice: Subject to any disclaimer, the term of this patent is extended or adjusted under 35 U.S.C. 154(b) by 334 days.

(21) Appl. No.: 18/525,162

(22) Filed: Nov. 30, 2023

(65) Prior Publication Data

US 2024/0187884 A1 Jun. 6, 2024

(30) Foreign Application Priority Data

Dec. 2, 2022 (GB) ..................................... 2218173

(51) Int. Cl.

*H04W 24/02* (2009.01)
*H04B 17/318* (2015.01)
*H04W 8/22* (2009.01)

(52) U.S. Cl.

CPC .......... *H04W 24/02* (2013.01); *H04B 17/328* (2023.05); *H04W 8/22* (2013.01)

(58) Field of Classification Search

CPC ......... H04W 8/22; H04W 8/24; H04W 24/10; H04W 24/02; H04W 52/0209; H04W 84/18; H04L 67/12; H04L 67/125; H04B 17/328

USPC .......................................................... 370/329

See application file for complete search history.

(56) References Cited

U.S. PATENT DOCUMENTS

2008/0160984 A1* 7/2008 Benes ............... H04M 1/72457 455/419
2013/0121176 A1 5/2013 Addepalli et al.
2019/0053013 A1* 2/2019 Markhovsky ............. G01S 5/12
2019/0089571 A1 3/2019 Novak, III et al.
2022/0225402 A1* 7/2022 Elkotby ................ H02J 50/001
2023/0028603 A1* 1/2023 Volkerink .......... G06K 7/10366
2024/0089725 A1* 3/2024 Wang ...................... G01S 7/006

(Continued)

FOREIGN PATENT DOCUMENTS

CN 105723684 B 3/2019
EP 4009714 A1 6/2022

(Continued)

OTHER PUBLICATIONS

"3rd Generation Partnership Project; Technical Specification Group Radio Access Network; NR; Physical channels and modulation (Release 17)", 3GPP TS 38.211, V17.2.0, Jun. 2022, pp. 1-136.

(Continued)

*Primary Examiner* — Chi Tang P Cheng
*Assistant Examiner* — Michael Wayne Maddox
(74) *Attorney, Agent, or Firm* — Lippes Mathias LLP

(57) ABSTRACT

Embodiments of the present disclosure disclose methods, apparatuses and computer readable medium for Internet of Things (IoT). A terminal device receives, from a communication device, a reflection signal. The reflection signal is indicative of energy level of the communication device. The energy level indicates energy stored in the communication device. Moreover, the terminal device indicates, to a network node, the energy level of the communication device.

15 Claims, 8 Drawing Sheets

(56) References Cited

U.S. PATENT DOCUMENTS

| | | | | |
|---|---|---|---|---|
| 2024/0179666 | A1* | 5/2024 | Wang | H04W 4/80 |
| 2025/0142471 | A1* | 5/2025 | He | H02J 50/001 |

FOREIGN PATENT DOCUMENTS

| | | | |
|---|---|---|---|
| EP | 4137896 | A1 | 2/2023 |
| TW | I530120 | B | 4/2016 |
| WO | 2014/109797 | A1 | 7/2014 |
| WO | 2019/067473 | A1 | 4/2019 |
| WO | 2019/158187 | A1 | 8/2019 |
| WO | 2021/154610 | A1 | 8/2021 |
| WO | 2021/244761 | A1 | 12/2021 |

OTHER PUBLICATIONS

"3rd Generation Partnership Project; Technical Specification Group Radio Access Network; NR; Physical layer procedures for control (Release 17)", 3GPP TS 38.213, V17.2.0, Jun. 2022, pp. 1-256.

"Moderator's summary of Discussion [RAN94e-R18Prep-28] Passive IoT", 3GPP TSG RAN#94e, RP-212688, Agenda Item: 8A.5, Ericsson, Dec. 6-17, 2021, pp. 1-45.

Lin et al., "Battery-Less IoT Sensor Node with PLL-Less Wi-Fi Backscattering Communications in a 2.5-μW Peak Power Envelope", Symposium on VLSI Circuits, Jun. 13-19, 2021, pp. 1-2.

Chen et al., "Reliable and Practical Bluetooth Backscatter With Commodity Devices", IEEE/ACM Transactions on Networking, vol. 29, No. 4, Aug. 2021, pp. 1717-1729.

Lyu et al., "A UHF/UWB Hybrid RFID Tag With a 51-m Energy-Harvesting Sensitivity for Remote Vital-Sign Monitoring", IEEE Transactions on Microwave Theory and Techniques, vol. 68, No. 11, Nov. 2020, pp. 4886-4895.

Tang et al., "Self-sustainable Long Range Backscattering Communication Using RF Energy Harvesting", IEEE Internet of Things Journal, vol. 8, No. 17, Sep. 1, 2021, pp. 13737-13749.

"Msc-generator", Sourceforge, Retrieved on Mar. 13, 2024, Webpage available at : https://sourceforge.net/projects/msc-generator/.

"3rd Generation Partnership Project; Technical Specification Group Radio Access Network; NR; Physical layer procedures for data (Release 17)", 3GPP TS 38.214, V17.2.0, Jun. 2022, pp. 1-229.

Iqbal et al., "GWINs: Group-Based Medium Access for Large-Scale Wireless Powered IoT Networks", IEEE Access, vol. 7, Nov. 26, 2019, pp. 172913-172927.

Combined Search and Examination Report received for corresponding United Kingdom Patent Application No. 2218173.9, dated May 26, 2023, 5 pages.

"Discussion on Passive IoT for 5G-Advanced", 3GPP TSG RAN Meeting #96, RP-221268, Agenda Item: 9.1, vivo, Jun. 6-9, 2022, 6 pages.

"Ambient IoT positioning", 3GPP TSG-RAN #100, RP-230862, Agenda Item: 9.2.2, Nokia, Jun. 12-14, 2023, 5 pages.

* cited by examiner

METHODS AND APPARATUSES FOR INTERNET OF THINGS

FIELD

Embodiments of the present disclosure generally relate to the field of communication, and in particular, to methods, apparatuses and computer readable medium for Internet of Things (IoT).

BACKGROUND

In Rel-18 of 3rd Generation Partnership Project (3GPP) radio access network (RAN) meeting, there was an interest to include IoT technology supporting battery-less devices, i.e. passive IoT. Therefore, it was agreed and approved to have a study on passive IoT.

The study targets on supporting of ultra-low complexity devices which consumes ultra-low power. But how to support ultra-low power consumption device in 3GPP is not clear now.

SUMMARY

In general, example embodiments of the present disclosure provide methods, apparatuses and computer readable medium for IoT.

In a first aspect, there is provided a terminal device. The terminal device comprises one or more transceivers; and one or more processors coupled to the one or more transceivers, and the one or more transceivers are configured, with the one or more processors, to cause the terminal device to: receive, from a communication device, a reflection signal, wherein the reflection signal is based on a signal received by the communication device, and wherein the reflection signal is indicative of at least energy level, the energy level indicates or associates with energy stored in the communication device; and indicate, to a network node, the energy level of the communication device.

In a second aspect, there is provided a network node. The network node comprises one or more transceivers: and one or more processors coupled to the one or more transceivers, and the one or more transceivers are configured, with the one or more processors, to cause the network node to: transmit or indicate an activator device to transmit, an activation signal to a communication device to activate the communication device; and receive, from a terminal device, information indicating at least energy level, wherein the energy level indicates or associated with energy stored in the communication device.

In a third aspect, there is provided a method implemented at a terminal device. The method comprises: receiving, from a communication device, a reflection signal, wherein the reflection signal is based on a signal received by the communication device, and wherein the reflection signal is indicative of at least energy level, the energy level indicates or associates with energy stored in the communication device: and indicating, to a network node, the energy level of the communication device.

In a fourth aspect, there is provided a method implemented at a network node. The method comprises: transmitting or indicating an activator device to transmit, an activation signal to a communication device to activate the communication device: and receiving, from a terminal device, information indicating at least energy level, wherein the energy level indicates or associates with energy stored in the communication device.

In a fifth aspect, there is provided an apparatus of a terminal device. The apparatus comprises: means for receiving, from a communication device, a reflection signal, wherein the reflection signal is based on a signal received by the communication device, and wherein the reflection signal is indicative of at least energy level, the energy level indicates or associates with energy stored in the communication device: and means for indicating, to a network node, the energy level of the communication device.

In a sixth aspect, there is provided an apparatus of a network node. The apparatus comprises: means for transmitting or indicating an activator to transmit, an activation signal to a communication device to activate the communication device: and means for receiving, from a terminal device, information indicating at least energy level, wherein the energy level indicates or associated with energy stored in the communication device.

In a seventh aspect, there is provided a terminal device. The terminal device comprises at least one processor: and at least one memory including computer program codes, wherein the at least one memory and the computer program codes are configured to, with the at least one processor, cause the terminal device to: receive, from a communication device, a reflection signal, wherein the reflection signal is based on a signal received by the communication device, and wherein the reflection signal is indicative of at least energy level, the energy level indicates or associates with energy stored in the communication device: and indicate, to a network node, the energy level of the communication device.

In an eighth aspect, there is provided a network node. The network node comprises at least one processor: and at least one memory including computer program codes, wherein the at least one memory and the computer program codes are configured to, with the at least one processor, cause the network node to: transmit or indicate an activator device to transmit, an activation signal to a communication device to activate the communication device: and receive, from a terminal device, information indicating at least energy level, wherein the energy level indicates or associates with energy stored in the communication device.

In a ninth aspect, there is provided a non-transitory computer readable medium comprising program instructions for causing an apparatus to perform at least the method according to third or fourth aspect.

In a tenth aspect, there is provided a computer program comprising instructions, which, when executed by an apparatus, cause the apparatus at least to: receive, from a communication device, a reflection signal, wherein the reflection signal is based on a signal received by the communication device, and wherein the reflection signal is indicative of at least energy level, the energy level indicates or associates with energy stored in the communication device; and indicate, to a network node, the energy level of the communication device.

In an eleventh aspect, there is provided a computer program comprising instructions, which, when executed by an apparatus, cause the apparatus at least to: transmit or indicate an activator device to transmit, an activation signal to a communication device to activate the communication device: and receive, from a terminal device, information indicating at least energy level, wherein the energy level indicates or associates with energy stored in the communication device.

In a twelfth aspect, there is provided a terminal device. The terminal device comprises receiving circuitry configured to receive, from a communication device, a reflection signal, wherein the reflection signal is based on a signal received by the communication device, and wherein the reflection signal is indicative of at least energy level, the energy level indicates or associates with energy stored in the communication device: and configured to indicate, to a network node, the energy level of the communication device.

In a thirteenth aspect, there is provided a network node. The network node comprises obtaining circuitry configured to transmit or indicate an activator to transmittag's, an activation signal to a communication device to activate the communication device: and configured to receive, from a terminal device, information indicating at least energy level, wherein the energy level indicates or associates with energy stored in the communication device.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

Throughout the drawings, the same or similar reference numerals represent the same or similar element.

DETAILED DESCRIPTION

Figure 1:
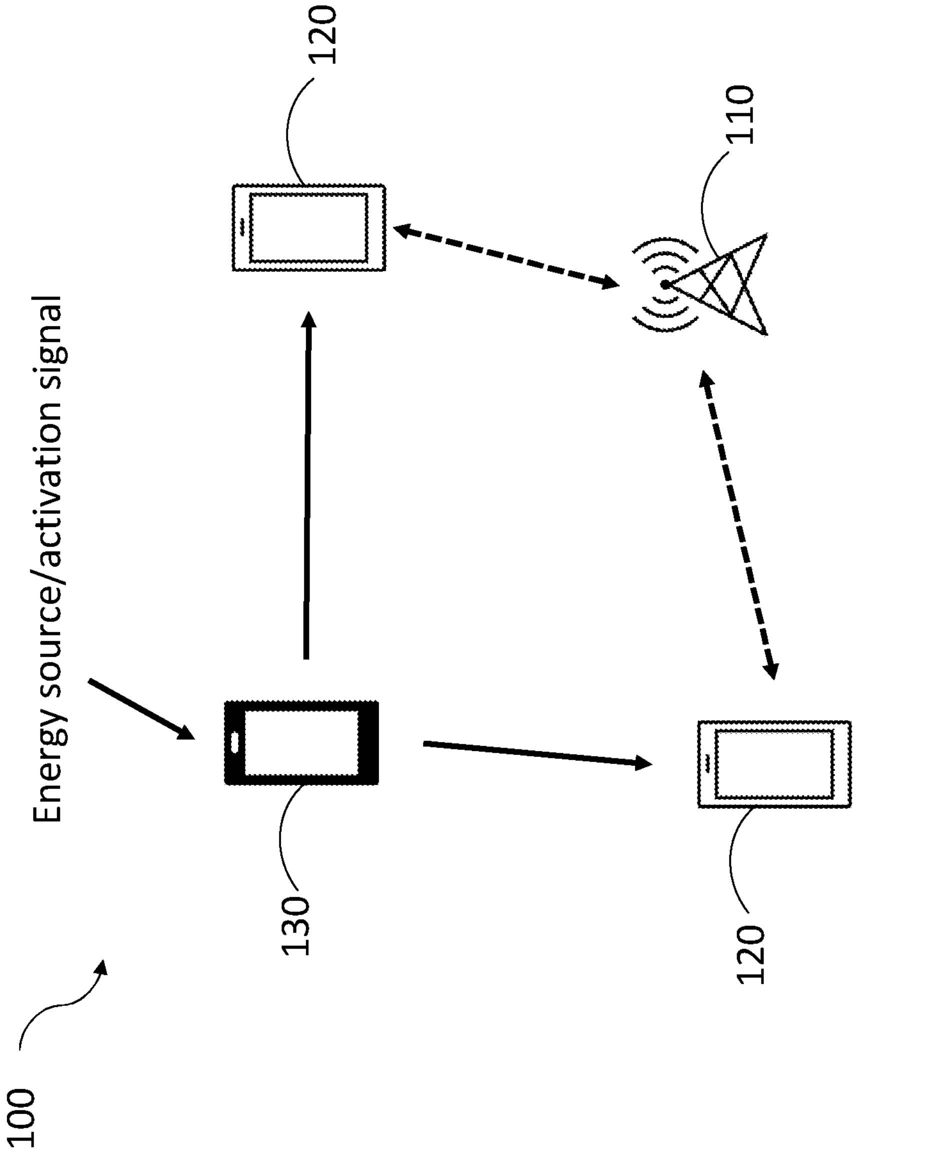
FIG. 1 illustrates an example radio network in which example embodiments of the present disclosure may be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof. As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term “communication network” refers to a network following any suitable communication standards, such as Long Term Evolution (LTE), LTE-Advanced (LTE-A), Wideband Code Division Multiple Access (WCDMA), High-Speed Packet Access (HSPA), Narrow Band Internet of Things (NB-IOT) and so on. Furthermore, the communications between a terminal device and a network device in the communication network may be performed according to any suitable generation communication protocols, including, but not limited to, the third generation (3G), the fourth generation (4G), 4.5G, the fifth generation (5G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term “network node” refers to a node in a communication network via which a terminal device accesses the network and receives services therefrom. The network node may refer to a base station (BS) or an access point (AP), for example, a node B (NodeB or NB), an evolved NodeB (eNodeB or eNB), a new radio (NR) NB (also referred to as a gNB), a remote radio unit (RRU), a radio header (RH), a remote radio head (RRH), road side unit (RSU) a relay, a low power node such as a femto, a pico, and so forth, depending on the applied terminology and technology. The network node may also refer to an entity, element or component within or connected to new generation radio access network (NG-RAN), for example, an access and mobility management function (AMF) entity, location management function (LMF) entity and an mobility management entity (MME).

The term “terminal device” refers to any end device that may be capable of wireless communication. By way of example rather than limitation, a terminal device may also be referred to as user equipment (UE), a subscriber station (SS), a portable subscriber station, an mobile station (MS), or an access terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an internet of things (IoT) device (e.g., passive or ambient IoT device), a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. In the following description, the terms “terminal device”, “terminal”, “reader”, “user equipment” or“UE” may be used interchangeably.

In order to support and integrate passive or ambient IoT device (herein may be referred as “tag”) into fifth-generation technology standard for broadband cellular networks (5G) NR network infrastructure, one initial task for the network may be to identify the coarse location of the tag, as there are no active elements of the tag and thus, there is no means for the tag to make itself be visible or heard.

Discovering a passive or ambient IoT device is a challenging task due to the inherent nature of passive radio. More precisely, the passive or ambient radio does not have a power source, but it harvests energy from e.g., radio waves, and it is most often mobile. It can hear other radios only in its own proximity (most often within a 5-10 m radius). Furthermore, its mobility and operation (i.e. how much data has collected) are transparent to the 5G NR network perspecitve. Because of the above limitations, the NR network cannot apply the typically NR UE paging operations and alternatives need to be defined.

In addition, the NR network can discover the charged tag only if the tag hears an activation signal strong enough so that it can generate a response which is strong enough to be heard by another nearby NR element (e.g., a gNB, RSU, UE, etc.). This means that the tag may start replying to an activation signal as soon as the harvested energy, e.g., $E_h$, is above a minimal threshold, e.g., $E_1$. However, depending on how large $E_h$ is, the tag's reply may be heard by a variable number of readers and may be measured with various degrees of accuracy.

In other words, the more frequent the tag needs to be localized which in turn leads to more frequent the tag needs to respond, the less time the tag has for energy harvesting. This subsequently lower the tag's transmit on-time and/or transmit power. As a result, the chances for successful localization are also lowered. To make matters worse, a tag whose localization has failed may be re-activated for re-transmission immediately after failure, giving it very little time to charge and thus only marginally increase the chance of successful localization in the next round.

In summary, the NR network needs to decide how often to activate a tag so that the tag may be localized within the target latency and accuracy constraints, while providing the tag enough time to charge sufficiently to be detected accurately by sufficient readers.

According to embodiments of the present disclosure, there is provided a solution, in particular signalling framework, for IoT. With this solution, a terminal device receives, from a tag, a reflection signal. The reflection signal may be indicative at least of energy level of the tag. For example, the energy level of the tag may indicate or associate with energy or amount of energy stored in the tag. The reflection signal may be based on a signal received by the tag. For example, the reflection signal may be a reply that is responsive to an activation signal received by the tag for activating the tag. Moreover, the terminal device indicates the energy level of the tag to a network node. For example, the terminal device may inform or indicate the network node of the the energy level of the tag via a report.

The reflection signal is based on a signal received by the tag may include but not limited to: the tag only reflects the received signal without any further operation for example due to the tage is with limited energy: the tag may module the received signal using different modulation technologies, for example binary phase-shift keying (BPSK); the tag may also generate a signal based on the received signal and the generated signal may include a payload comprising at least part of data stored in of the tag.

By using of energy information, this framework may assist network to optimize the next detection or localization session, for examples:

- The network may increase the duration of the next charging signal in order to charge the tag more in the next session (applicable for radio frequency (RF) energy havesting tags)
- The network may delay the next activation signal with respect to:
  - the charging signal (when two signals are distinct) for RF harvesting tags; or
  - the last activation signal in order to allow sufficient timg for tag to charge.
- The network may improve selection of readers, for examples, readers which have better detection performance if the most recent tag detection/localization yielded unsatisfactory results, etc.
- Different detection and/or localization methods may be triggered based on the energy level of the tag, at the moment the tag replies.

Hereinafter, principle and embodiments of the present disclosure will be described in detail below with reference to the accompanying drawings. Reference is first made to FIG. 1, which illustrates an example radio network 100 in which example embodiments of the present disclosure can be implemented.

The radio network 100, which may be a part of a communication network, comprises one or more terminal devices 120, a network node 110 which communicates with the one or more terminal devices 120 and/or with at least one tag 130.

The radio network 100 may comprise any suitable number of terminal devices 120 and tag 130. In the radio network 100, the terminal device(s) 120 and the network node 110 can exchange data and control information each other. A link from the network node 110 to the terminal device(s) 120 may be referred to as a downlink (DL), while a link from the terminal device 120 to the network node 110 may be referred to as an uplink (UL).

A link in the present disclosure may be a communication channel that connects two or more devices for transmission of data or signalling. The link may be a dedicated physical link or a virtual circuit that uses one or more physical links or shares a physical link with other links.

It is to be understood that four devices are shown in the radio network 100 only for the purpose of illustration, without suggesting any limitation to the scope of the present disclosure. In some example embodiments, the radio network 100 may comprise a further device to communicate with the terminal device(s) 120, network node 110 and tag 130.

The communications in the radio network 100 may follow any suitable communication standards or protocols, which are already in existence or to be developed in the future, such as Universal Mobile Telecommunications System (UMTS), long term evolution (LTE), LTE-Advanced (LTE-A), the fifth generation (5G) New Radio (NR), Wireless Fidelity (Wi-Fi) and Worldwide Interoperability for Microwave Access (WiMAX) standards, and employs any suitable communication technologies, including, for example, Multiple-Input Multiple-Output (MIMO), Orthogonal Frequency Division Multiplexing (OFDM), time division multiplexing (TDM), frequency division multiplexing (FDM), code division multiplexing (CDM), Bluetooth, ZigBee, and machine type communication (MTC), enhanced mobile broadband (eMBB), massive machine type communication (mMTC), ultra-reliable low latency communication (URLLC), Carrier Aggregation (CA), Dual Connectivity (DC), and New Radio Unlicensed (NR-U) technologies.

Figure 7:
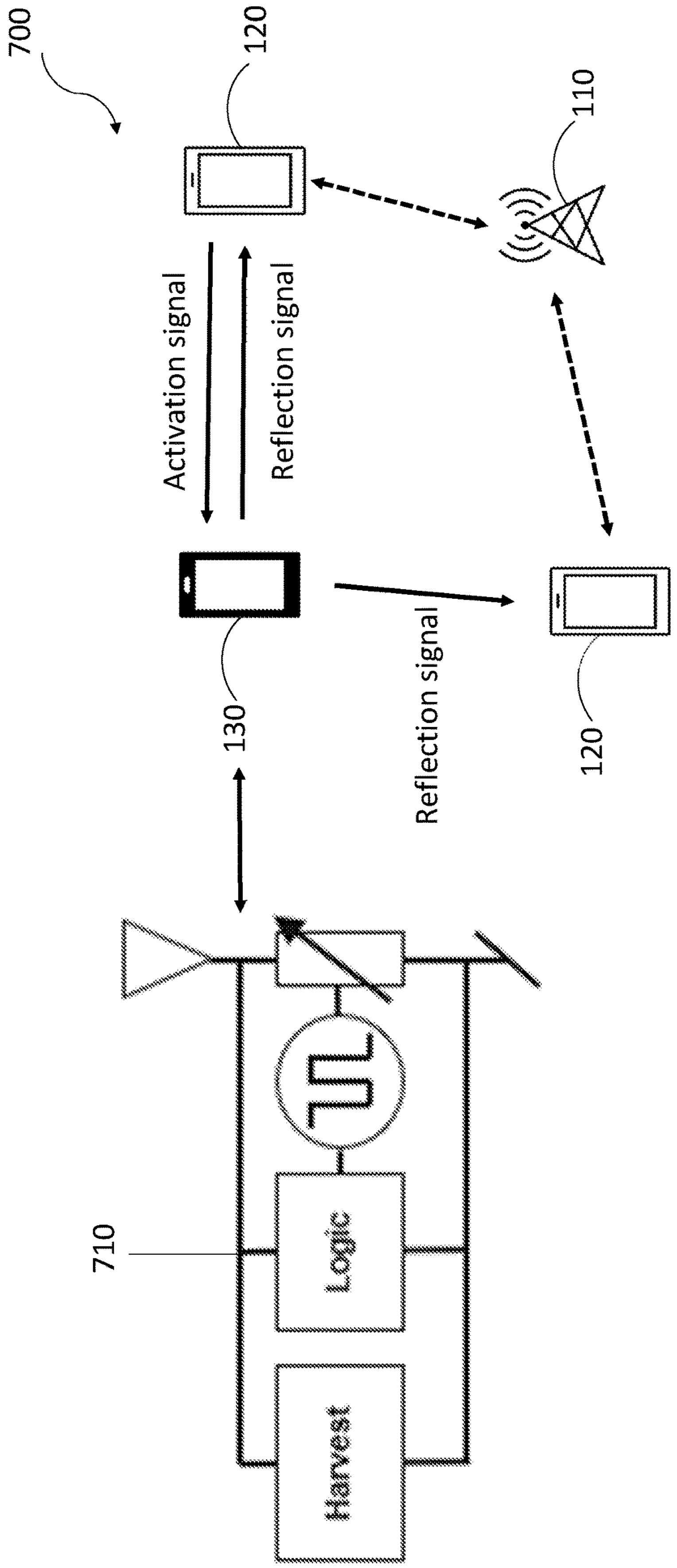
FIG. 7 illustrates an example radio network in which example embodiments of the present disclosure operating in full-duplex (FD) mode may be implemented.
Figure 8:
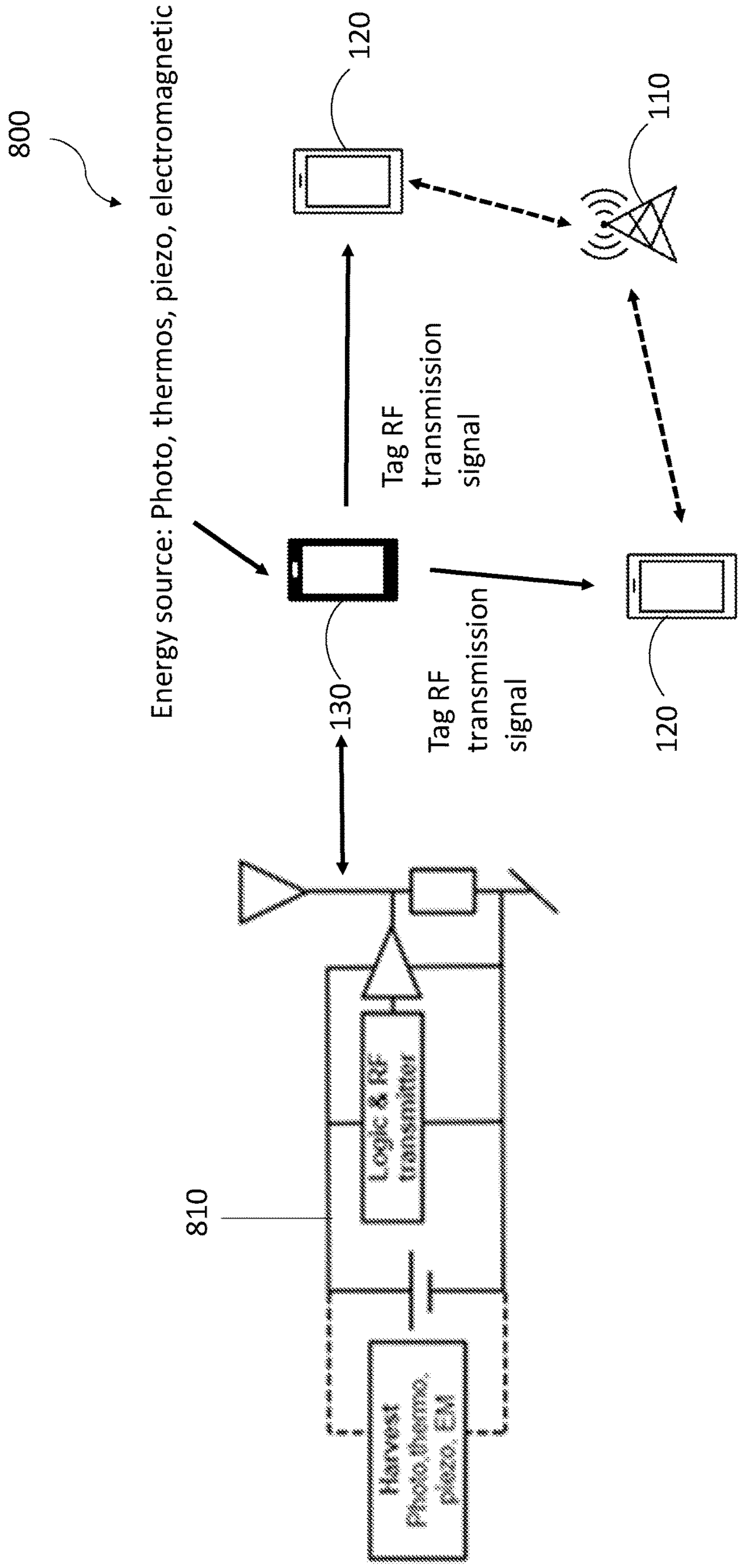
FIG. 8 illustrates an example radio network in which example embodiments of the present disclosure operating in half-duplex (HD) mode may be implemented.

The tag 130 may be referred as communication device in the present disclosure. The tag 130 is capable to operate as an IoT device. The term "tag" and "communication device" may be used interchangeably in the present disclosure. It should be noted that the tag 130 may also be a terminal device. In other words, the tag 130 may be a terminal device which may support the functionality of an IoT device. The tag 130 may or may not comprise of battery or power source connected to itself. The tag 130 may operate in full-duplex (herein referred as FD) or half-duplex (herein referred as HD) mode. FIG. 7 and FIG. 8 illustrate example simplified embodiments of the tag operating in full-duplex (FD) mode and half-duplex (HD) mode may be implemented respectively.

FIG. 7 illustrates an example of the tag's operation in FD mode 700 in the radio network 100. In FD mode 700, the tag 130 which integrates a FD circuit 710 may receive a dedicated RF activation signal (herein referred as activation signal) transmitted by an activator device for charging. An activator device may be terminal device 120, network node 110, or another terminal device or another network node not shown in radio network 100. The tag 130 charges itself using the received activation signal. The circuitry 710 in may be used to realize at least some of the actions performed by the tag 130.

When the tag 130 harvested enough energy, the tag 130 may modulate a reflection signal with the tag's identification (ID) sequence when the activation signal is detected. As such, the tag 130 may be not performing active transmission but simply modulate the reflection signal of the incoming RF activation signal. A terminal device(s) 120 (which may act as reader and refer as tag reader) may receive and decode the ID of the tag's reflection signal. The tag reader may be the same or different device as the activator device.

In the case of FIG. 7, the tag reader may need to measure the tag's reflection signal when the activation signal is actively transmitting. Both activation signal and tag's reflection signal may be overlapping in time at the tag reader. A tag which may operate in FD may also be referred as passive tag.

FIG. 8 illustrates an example of the tag's operation in HD mode 800 from radio network 100. In HD mode 800, the tag 130 which integrates a HD circuit 810 may harvest energy from any activator device or energy source (e.g. photo taking, thermo, piezo or electromagnetic) and may transmit a tag's identification (ID) signal on ad-hoc basis or periodic basis whenever the stored energy of the tag 130 is above a certain threshold. The circuitry 810 in may be used to realize at least some of the actions performed by the tag 130.

The tag 130 integrated with HD circuit may also transmit its ID signal even when the source of energy harvesting is not available if the stored energy of the tag 130 is above the certain threshold. In other words, the tag 130 may harvest and store energy from the activator or energy source and transmits its ID signal actively when the stored energy reaches the certain threshold.

A tag reader (e.g. the terminal device(s) 120) may need to detect and measure continuously for tag's ID signal due to ad-hoc transmission of tag's ID signal. Both activator or energy harvest signal and tag's ID transmission can be separated in time. A tag 130 which operates in HD as FIG. 8 may also be referred as semi-passive tag.

Figure 2:
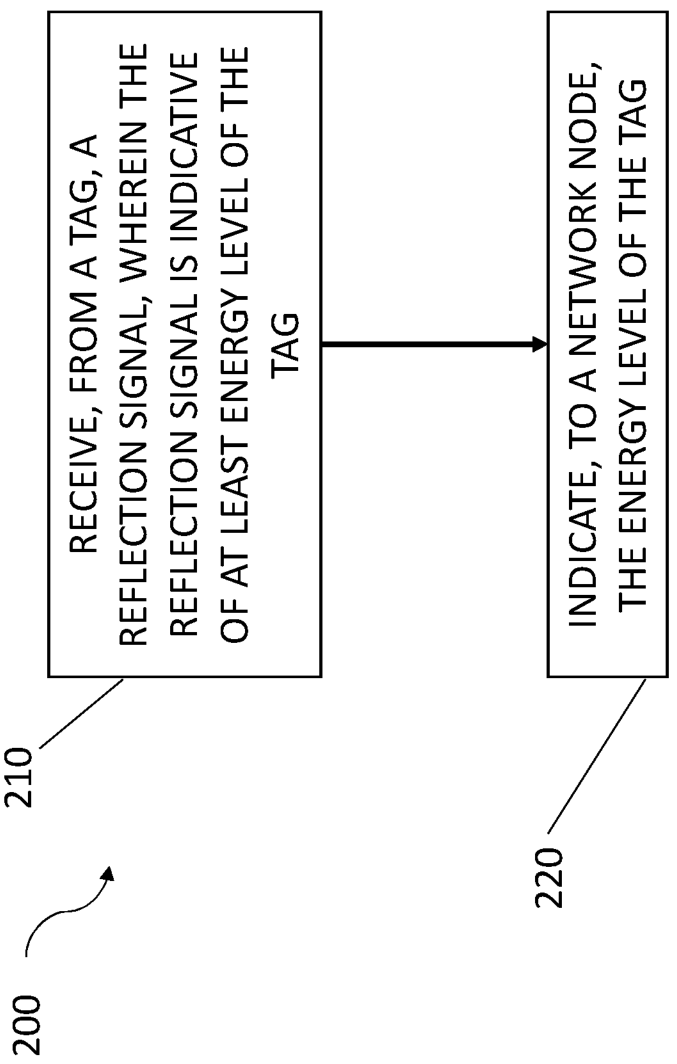
FIG. 2 illustrates an example flowchart of a method implemented at a terminal device according to example embodiments of the present disclosure.

FIG. 2 illustrates an example flowchart of a method 200 implemented at a terminal device according to example embodiments of the present disclosure. For the purpose of discussion, the method 200 will be described from the perspective of the terminal device 120 with reference to FIG. 1.

As shown in FIG. 2, at block 210, the terminal device 120 receives, from the tag 130, a reflection signal. The reflection signal may be indicative of at least energy level of the tag 130. The reflection signal may be a signal transmitted by the tag 130 in response to or based on a stimulus signal, e.g. activation signal. Alternatively, the reflection signal may be a signal transmitted by the tag 130 when the tag's energy level reaches a certain threshold. That is, the reflection signal may be transmitted by the tag 130 without in response to or based on a stimulus signal, e.g. activation signal. This may be applicable for the case which the tag harnesses energy from from any activator device or energy source (e.g. photo taking, thermo, piezo or electromagnetic).

In some example embodiments, the reflection signal may be an interrogation response signal or a response signal to an interrogation signal received by the tag 130. The interrogation signal may be a stimulus signal, e.g. activation signal to activate the tag 130. The interrogation response signal may be indicative of at least energy level of the tag 130. For example, the energy level of the tag 130 may indicate, associate with, or correspond to energy or amount of energy stored in the tag 130. In some example embodiment, the reflection signal may comprise transmission of a signal responsive to an interrogation signal received by the tag 130. The signal may be indicative of at least energy level of the tag 130. The interrogation signal may be a stimulus signal, e.g. activation signal to activate the tag 130.

In some example embodiments, the energy level may indicate, associate with, or correspond to energy or amount of energy stored or available in the tag 130. For example, the energy level may be a current energy level that corresponds to or associates with the energy or the amount of energy stored or available in the tag 130 before transmitting a reflection signal from the tag 130. In another example, the energy level may be a current energy level that corresponds to or associates with the energy or the amount of energy stored or available in the tag 130 during transmitting a reflection signal from the tag 130. Yet, in another example, the energy level may be a current energy level that corresponds to or associates with the energy or the amount of energy stored or available in the tag 130 after transmitting a reflection signal from the tag 130.

In some example embodiments, the energy level may be expressed or represented in various ways. For example, the energy level may be expressed or represented in terms of full charge for the tag 130. Alternatively, the energy level may be an absolute value expressed in Watt or milliWatt (mW), for example. Optionally or alternatively, the energy level may be percentage of capacity of the communication device, for example one energy level may correspond to 30%-50% of the capacity, and the capacity of the communication device may be reported to or known by the network node.

The energy level of the tag 130 may be increased by charging the tag 130 using an activation signal received by the tag 130,). The energy level of the tag 130 may be increased by energy harvesting at the tag 130 from energy sources, such as, for example, photo taking, thermo, piezo or electromagnetic. The energy level of the tag 130 may decrease due to e.g. generation of a reflection signal.

One or more energy level may be predefined or configured by the network node. If the energy level is configured by the network node, some specific signalling will be used for the configuration, include but not limited to for example radio resource control (RRC), or any layer 2 signalling.

In some example embodiments, the terminal device 120 may obtain configuration information. The configuration information may comprise at least one of the following: at least one identifier (ID) of the tag 130, at least one signature, and/or at least one energy level associated with the signature. The signature may be in a form of signal characteristic. Signal characteristics may include at least one or more of the following: waveform, time-frequency resources in which the wave is sent, modulation order, and code. The signature, e.g. $S_i$, may define bandwidth $B_i$, carrier frequency $f_i$ and sampling rate $fs_i$, which carries a Zadoff-Chu sequence of root $r_i$, and length $L_i$. In other words, the signature may be the necessary and/or minimum set of parameters required to generate the reflection signal.

In some example embodiments, the terminal device 120 may obtain configuration information by receiving the configuration information from the network node 110, or by obtaining preconfigured configuration information in the terminal device 120 or pre-defined configuration information. For example, the 3GPP specifications may define multiple sequences or signatures which are associated with different energy levels for the tag 130. For this case, the network node 110 may only need to transmit tag's ID to terminal device 120. In some example embodiments, the terminal device 120 may receive the configuration information in a long term evolution, LTE, positioning protocol, LPP.

In some example embodiments, the configuration information may indicate implicit energy level information which may correspond to mapping between the energy level and at least one signature. For example, the tag 130 may be configured or pre-configured with identifier (ID) X. The tag 130 with ID X may be configured with a set of signatures $\{S_1, \ldots, S_K\}$ in which each energy level $E_i$ (which means energy level with index i) may be mapped to $S_i$ (which means signature with index i), for example, $E_1$ maps to $S_1$ and $E_K$ maps to $S_K$. That is, energy level with a certain index (e.g. 1) may map to a signature with corresponding index. (e.g. 1). The configuration information may comprise or indicate mapping between multiple energy levels and corresponding signatures, wherein, for example, one energy level may correspond to one signature. For example, for a tag 130 with X, the network node 110 may define a list of K tag's signal signatures which the tag uses depending on the energy level:

A. Energy level $E_1=[e_1, e_2]$: use signature $S_1$, where $S_1$ defines the parameters for generating the reply or reflection waveform. $[e_1, e_2]$ may indicate the energy level $E_1$ is between $e_1$ and $e_2$. For example, $S_1$ may parameterize a multicarrier signal of bandwidth $B_1$, carrier frequency $f_1$, sampling rate $f_{s1}$, which carries a Zadoff-Chu sequence of root $r_1$ and length $L_1$;
B. Energy level $E_2=[e_2, e_3]$, $E_3=[e_3, e_4]$, . . . $[e_2, e_3]$ may indicate the energy level $E_2$ is between $e_2$ and $e_3$;
C. Energy level $E_K=[e_K, e_{K+1}]$: use signature $S_K$, where $S_K$ defines the parameters for generating the reply or reflection waveform. $[e_K, e_{K+1}]$ may indicate the energy level $E_K$ is between $e_K$ and $e_{K+1}$. For example, $S_K$ may parameterize a multicarrier signal of bandwidth $B_K$, carrier frequency $f_K$, sampling rate $f_{sK}$, which carries a Zadoff-Chu sequence of root $r_K$ and length $L_K$, wherein K is integer. $e_K$ may be percentage of full charge for the tag 130. Alternatively, $e_K$ may be absolute value expressed in Watt.

In some example embodiments, a mapping between $E_i$ and $S_i$ above may be predefined. For example standard defines the mapping between energy level $E_i$ and the signature $S_i$, and the tag 130 may be preconfigured with the mapping.

In some example embodiment, the terminal device 120 may be configured to detect tag with ID, e.g. X, via a new information element (IE) request from the network node 110. The new IE request may be based on LPP, for example, LPP IE request. The LPP IE request may comprise mapping of A to C defininig the association between one or more energy levels and one or more signatures.

In some example embodiments, the terminal device 120 may determine the energy level of the tag 130 based on the reflection signal and the configuration information. In some example embodiments, the reflection signal may indicate or be indicative of at least a signature. In some example embodiments, the signature may indicate or be associated with energy level of the tag 130. For example, the terminal device 120 may evaluate a signature, e.g. $S_i$, indicated from the received reflection signal to determine the energy level of the tag, e.g. $E_i$. For example, the terminal device 120 may attempt to detect the tag by cross-checking between the signature which the tag 130 has used and the corresponding energy level of the tag. For example, the configuration information may be used, by the terminal device 120, in determining energy level of the tag 130 by determining an energy level corresponding to the signature from the configuration information. In some examples, the signature may be referred to as a reflection signal signature for the reflection signal. As described above, the configuration information may comprise information on an association between one or more signatures and one or more corresponding energy levels. Thus, when the signature of the tag 130 is determined by the terminal device 120 based on the received reflection signal, the energy level of the tag 130 may be determined based on the information on the association.

In some example embodiments, the terminal device 120 may determine a signature based on the received reflection signal. For example, the signature may be defined by one or more characteristics of the reflection signal as discussed above. The configuration information may indicate, as discussed, a mapping or an association between one or more energy levels and one or more signatures. Based on the mapping or association and the determined signature of the received reflection signal, the terminal device 120 may determine energy level of the tag 130. For example, the determined signature may correspond to a certain energy level in the configuration information.

In some example embodiments, the terminal device 120 may transmit, by the terminal device 120, capability information to the network node 110. The capability information may indicate at least the terminal device 120 may support reflection signal detection. By receiving the capability information, the network node 110 may configure and/or transmit configuration information to the corresponding terminal device 120 so that the terminal device may perform the determining of a signature and/or energy level of the tag 130 as discussed above.

In some example embodiments, the reflection signal may include at least a payload comprising at least part of data stored in the tag 130. The data may refer to data which the tag 130 may be required to collect, store and/or transmit, such as the values of humidity (e.g. in terms of a percentage of relative humidity), pressure (e.g. in Pascal), temperature (e.g. in Celsius, Kelvin or Fahrenheit) etc. and the timestamps (e.g. in date and time up to seconds or miliseconds) in which the values are collected. The data may be stored in the tag 130 for transmission.

In some example embodiments, the payload of the relection signal from the tag 130 may be un-encrypted or encrypted based on the energy level indicated by the reflection signal. In some example embodiments, the payload of the relection signal may be un-encrypted when the energy level of the tag 130 is medium. In some example embodiments, at least part of the payload of the relection signal may be encrypted when the energy level of the tag 130 is full.

In some example embodiments, full energy level may correspond to energy level at 100%, or at least substantially close to 100% (e.g. 100% with a margin of error). Minimal energy level may correspond to the minimum energy level required by the tag 130 or a certain threshold of energy level which the tag 130 needs to reach in order to generate and/or transmit the reflection signal. Medium energy level may correspond to energy level which is lower than full energy level but at least higher than minimal energy level.

In some example embodiments, a more extensive mapping between the tag's ID, energy level, a payload of the relection signal, and signature S of the tag may be defined. In other words, the tag 130 may reply the activation signal or transmit the reflection signal with different amount of stored information, based on its energy level. For example:

I. Tag with minimal energy level may transmit a reflection signal comprising with its own ID. That is, the reflection signal may not comprise a payload. In some examples, the reflection signal may only comprise ID of the tag;

II. Tag with medium energy level may transmit with a reflection signal comprising:
   i. A first part carrying ID information and implicit energy level information as described in example embodiments above: and
   ii. A second part encoding, in the signal payload e.g., the payload of the reflection signal, a subset of stored data of the payload that does not require encryption III. Tag with full energy level may transmit with reflection signal comprising:
   i. A first part carrying both ID and explicit or implicit energy level information as described in example embodiments above; and
   ii. A second signal part encoding in the signal payload, e.g., the payload of the reflection signal:
      a. A first subset of un-encrypted data: and
      b. A second subset of encrypted data.

In some example embodiments, the terminal device 120 may be configured with characterization of I, II and III via for example a new LPP IE request.

In some example embodiments, the terminal device 120 may determine the energy level of the tag 130 based at least on the payload of the reflection signal from the tag 130. As discussed above, the reflection signal may comprise the payload of the reflection signal from the tag 130 and the payload may be un-encrypted or at least part of the payload is encrypted for transmission of the reflection signal to the terminal device 120. For example, the terminal device 120 may determine or consider the energy level of the tag 130 is medium when the payload of the reflection signal from the tag 130 is un-encrypted. For example, the terminal device 120 may determine the energy level of the tag 130 is full when at least part of the payload of the reflection signal from the tag 130 is encrypted. For example, the terminal device 120 may determine or consider the energy level of the tag 130 is minimal when there is no payload in the reflection signal (i.e. the reflection signal may only comprise ID of the tag 130).

In some example embodiments, the terminal device 120 may detect the reflection signal from the tag 130 using different measurement methods based on the energy level of the tag 130. For example, the terminal device 120 may trigger measurement method i based on the determined $E_i$ and perform measurement on reflection signal using measurement method i. For example, the terminal device 120 may activate the measurement algorithm i, which is expected to ensure optimum detection of signal $S_i$. For example, if $S_i$ is associated with full tag energy level, the terminal device 120 may use a simple peak-detection method to estimate the distance to the tag. Conversely, if $S_i$ is associated with low tag energy, the terminal device 120 may trigger a measurement method that first attempts to cancel interference from the received signal.

Then, as shown in FIG. 2, at block 220, the terminal device 120 indicates, to the network node 110, the energy level of the tag 130. The energy level may indicate, associate with, or correspond to energy or amount of energy stored or available in the tag 130. As discussed above, the energy level of the tag 130 may be determined, by the terminal device 120, based on e.g. reflection signal received or detected by the terminal device 120 and the configuration information.

In some example embodiments, the terminal device 120 may transmit, to the network node 110, energy information of the tag 130 via a report, for example. The report may indicate or comprise at least the energy information of the tag 130. The energy information may indicate at least energy level of the tag 130. For example, the report may be transmitted together in a measurement report via LPP IE report. In some example embodiments, the report may be transmitted as a new LPP IE report.

Figure 3:
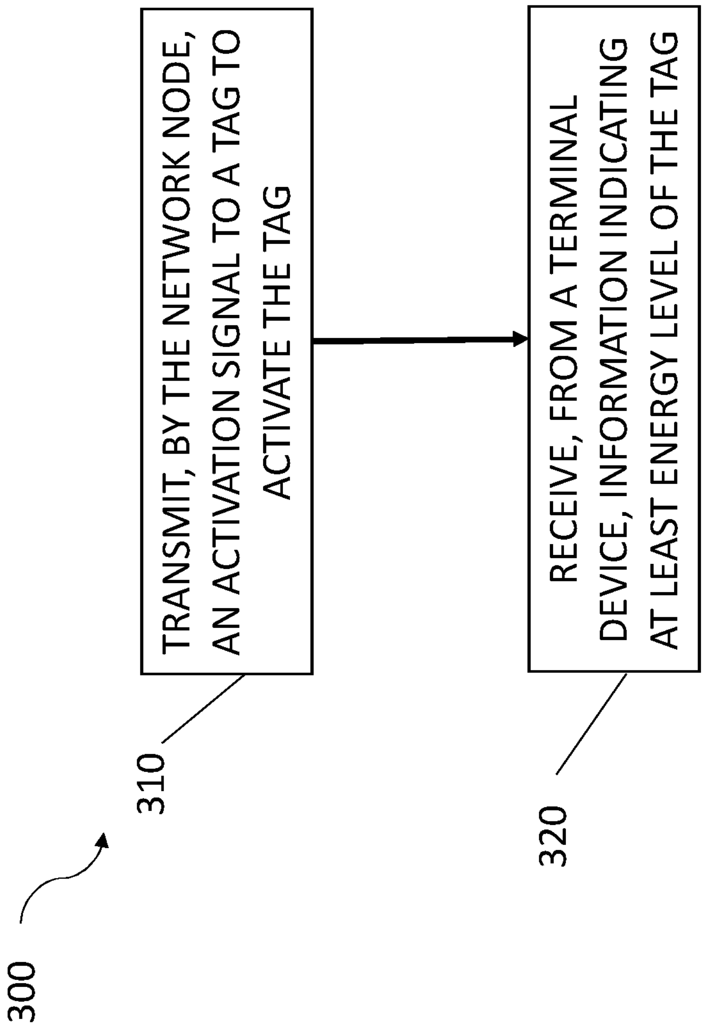
FIG. 3 illustrates an example flowchart of a method implemented at a network node according to example embodiments of the present disclosure.

FIG. 3 illustrates a flowchart of an example method 300 implemented at a network node (for example, the network node 110) in according to example embodiments of the present disclosure. For the purpose of discussion, the method 300 will be described from the perspective of the network node 110 with reference to FIG. 1.

As shown in FIG. 3, at block 310, the network node 110 may transmit, by the network node 110, an activation signal to the tag 130. The activation signal may be used to activate the tag 130. The activation of the tag 130 may comprise of the tag generates and/or transmits a reflection signal in response of the activation signal. The network node 110 may not transmit activation signal directly to the tag 130, it may command/request another user device sending activation signal to the tag 130. It should be understand that the network node 110 may transmit or indicate another user device (which is called activator device) to transmit an activation signal to the tag 130.

In some example embodiments, the network node 110 may transmit configuration information to the terminal device 120. The configuration information may comprise at least one of the following: at least one identifier (ID) of the tag 130, at least one signature, and/or at least one energy level associated with the signature. In some example embodiments, the configuration information may be transmitted in a long term evolution, LTE positioning protocol, LPP.

In some example embodiments, the configuration information may indicates mapping between the energy level and at least one signature. For example, the tag 130 may be configured or pre-configured with ID X. The tag 130 with X may be configured with a set of signatures $\{S_1, \ldots, S_K\}$ in which each energy level $E_i$ (which means energy level with index i) maps to $S_i$ (which means signature with index i), for example, $E_1$ maps to $S_1$ and $E_K$ maps to $S_K$. For example, for a tag with ID X, the network node 110 may define a list of K tag's signal signatures which the tag uses depending on the energy level:

A. Energy level $E_1=[e_1, e_2]$: use signature $S_1$, where $S_1$ defines the parameters for generating the reply or reflection waveform. $[e_1, e_2]$ may indicate the energy level $E_1$ is between $e_1$ and $e_2$. For example, $S_1$ may parameterize a multicarrier signal of bandwidth $B_1$, carrier frequency $f_1$, sampling rate $f_{s1}$, which carries a Zadoff-Chu sequence of root $r_1$ and length $L_1$;

B. Energy level $E_2=[e_2, e_3]$, $E_3=[e_3, e_4]$, . . . $[e_2, e_3]$ may indicate the energy level $E_2$ is between $e_2$ and $e_3$;

C. Energy level $E_K=[e_K, e_{K+1}]$: use signature $S_K$, where $S_K$ defines the parameters for generating the reply or reflection waveform. $[e_K, e_{K+1}]$ may indicate the energy level $E_K$ is between $e_K$ and $e_{K+1}$. For example, $S_K$ may parameterize a multicarrier signal of bandwidth $B_K$, carrier frequency $f_K$, sampling rate $f_{sK}$, which carries a Zadoff-Chu sequence of root $r_K$ and length $L_K$.

In some example embodiments, a mapping between $E_i$ and $S_i$ above may be predefined. For example standard defines the mapping between energy level $E_i$ and the signature $S_i$, and the tag 130 may be preconfigured with the mapping.

In some example embodiment, the network node 110 may configure terminal device 120 to detect tag with ID X via a new information element (IE) request. The new IE request may be based on LPP, for example, LPP IE request. The LPP IE request may contains the mapping of A to C.

In some example embodiments, the network node 110 may receive, from the terminal device 120, capability information. The capability information may indicate that the terminal device 120 may support reflection signal detection.

Then, as shown in FIG. 3, at block 320, the network node 110 receives, from the terminal device 120, information indicating at least energy level of the tag 130. The energy level may indicate, associate with, or correspond to energy or amount of energy stored or available in the tag 130, as discussed above. The information may be received as an IE.

In some example embodiment, the network node 110 may receive, from the terminal device 120, energy information of the tag 130 via a report. For example, the report may indicate or include at least the energy information of the tag 130. The energy information may indicate at least energy level of the tag 130. The report may be received together in a measurement report via LPP IE report. In some example embodiments, the report may be received as a new LPP IE report.

Figure 4:
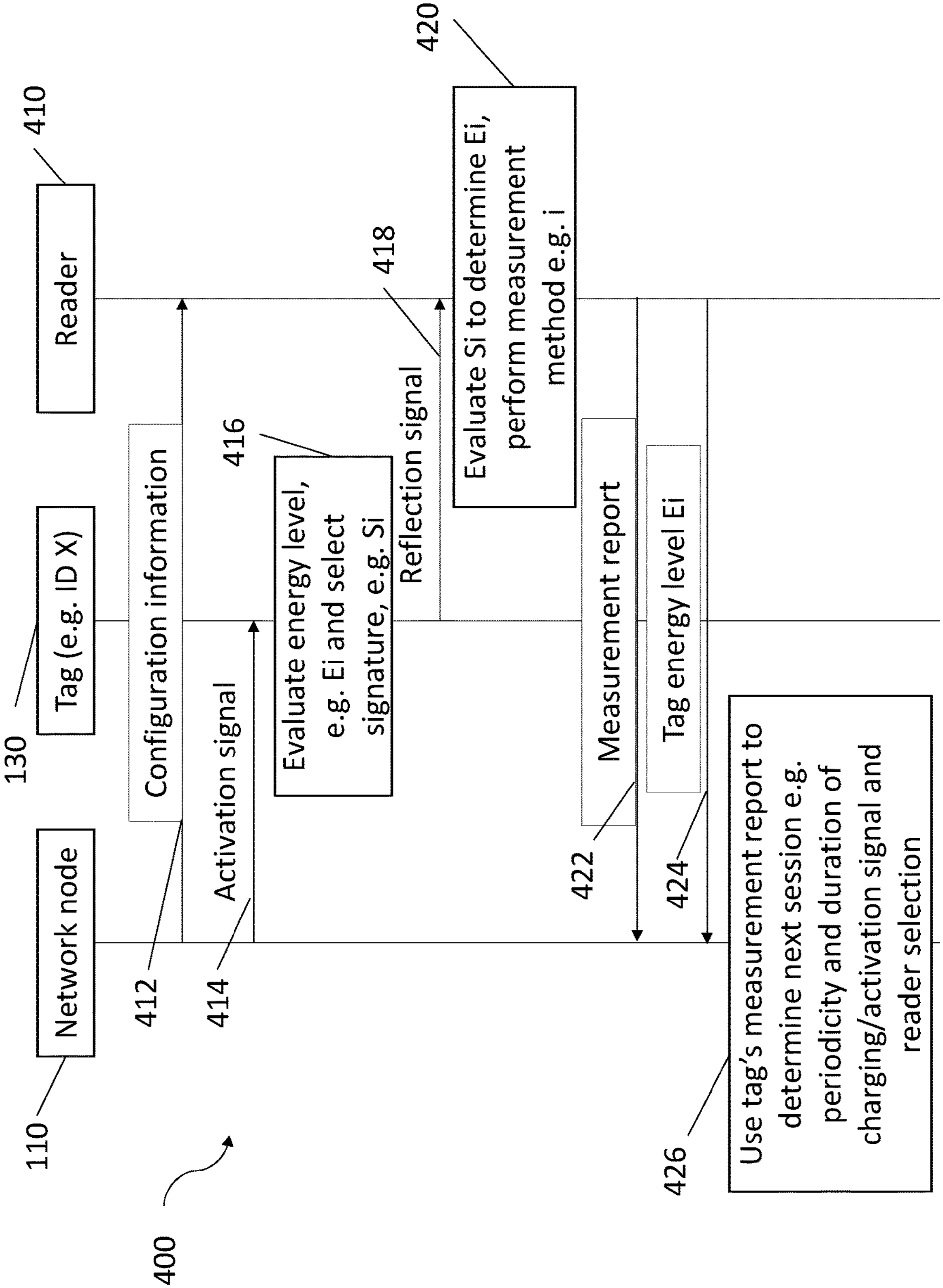
FIG. 4 illustrates an example flowchart of the method implemented at a network node, a tag and a reader according to example embodiments of the present disclosure.

FIG. 4 illustrates an example signalling diagram of a method 400 implemented among network node 110, tag 130 and reader 410 according to example embodiments of the present disclosure. The reader 410 may refer to a NR element which may corresponds to terminal device 120, another terminal device or another network node. For the following discussion, the reader 410 will be assumed as the terminal device 120 for method 400. The method 400 will be described from both perspectives of the reader 410 and the network node 110 with reference to FIG. 1.

As shown in FIG. 4, the network node 110 transmits a configuration information to the reader 410 in step 412. The configuration information may comprise at least one of the following: one identifier (ID) of the tag, one signature and/or one energy level associated with the signature. The signature may be in a form of signal characteristic, e.g., waveform, time-frequency resources in which the wave is sent, modulation order, code, etc. The signature, e.g. $S_i$, may define bandwidth $B_i$, carrier frequency $f_i$ and sampling rate $fs_i$, which carries a Zadoff-Chu sequence of root $r_i$, and length $L_i$. In other words, the signature may be the necessary and/or minimum set of parameters required to generate the reflection signal. In some example embodiments, the configuration information may be transmitted from network node 110 to reader 410 in a long term evolution, LTE, positioning protocol, LPP via a new Information Element (IE) request, for example, LPP IE request, or any other signaling for example radio resource control, RRC.

In some example embodiments, the reader 410 may obtain pre-configured configuration information in the reader 410 or pre-defined configuration information. For example, the 3GPP specifications may define multiple sequences or signatures which are associated with different energy levels for the tag 130. For this case, the network may only need to transmit the ID of the tag to reader.

In some example embodiments, the configuration information may indicate implicit energy level information which may correspond to mapping between the energy level and at least one signature. For example, the tag 130 may be configured or pre-configured with identifier (ID) X. The tag 130 with ID X may be configured with a set of signatures $\{S_1, \ldots, S_K\}$ in which each energy level $E_i$ (which means energy level with index i) maps to $S_i$ (which means signature with index i), for example, $E_1$ maps to $S_1$ and $E_K$ maps to $S_K$. For example, for a tag with ID X, the network node 110 may define a list of K tag's signal signatures which the tag uses depending on the energy level:

A. Energy level $E_1=[e_1, e_2]$: use signature $S_1$, where $S_1$ defines the parameters for generating the reply or reflection waveform. $[e_1, e_2]$ may indicate the energy level $E_1$ is between $e_1$ and $e_2$. For example, $S_1$ may parameterize a multicarrier signal of bandwidth $B_1$, carrier frequency $f_1$, sampling rate $f_{s1}$, which carries a Zadoff-Chu sequence of root $r_1$ and length $L_1$;

B. Energy level $E_2=[e_2, e_3]$, $E_3=[e_3, e_4]$, . . . $[e_2, e_3]$ may indicate the energy level $E_2$ is between $e_2$ and $e_3$;

C. Energy level $E_K=[e_K, e_{K+1}]$: use signature $S_k$, where $S_k$ defines the parameters for generating the reply or reflection waveform. $[e_K, e_{K+1}]$ may indicate the energy level $E_K$ is between $e_K$ and $e_{K+1}$. For example, $S_K$ may parameterize a multicarrier signal of bandwidth $B_K$, carrier frequency $fK_k$, sampling rate $f_{sK}$, which carries a Zadoff-Chu sequence of root $r_K$ and length $L_K$, wherein K is integer. $e_K$ may be percentage of full charge for the tag 130. Alternatively, ex may be absolute value expressed in Watt.

In some example embodiments, a mapping between $E_i$ and $S_i$ above may be predefined. For example standard defines the mapping between energy level $E_i$ and the signature $S_i$, and the tag 130 may be preconfigured with the mapping.

In some example embodiments, the reader 410 may be configured to detect tag with identifier (ID), e.g. X via a new IE, for example, LPP IE request, from network node 110 which may comprise the mapping of A to C definining the association between one or more energy level and one or more signature.

Then, as shown in FIG. 4, the network node 110 transmits or indicates another user device to transmit an activation signal to the tag 130 in step 414. For example, the network node 110 may activate the tag 130 via activation signal. In response of receiving the activation signal, the tag 130 may evaluate its energy level, e.g., $E_i$, and select a signature, e.g., $S_i$, where i=1 . . . K, based on the energy level $E_i$, to be transmitted as reflection signal as shown in block 416. The tag 130 may transmit a reflection signal to the reader 410 in step 418. The reflection signal in step 418 may be indicative of at least energy level of the tag 130. The energy level may indicate, associate with, or correspond to energy or amount of energy stored or available in the tag, as discussed above. In some example embodiments, the reflection signal may indicate a signature. In some example embodiments, the signature may indicate, associate with, or correspond to energy level of the tag 130.

In response of receiving the reflection signal, the reader 410 may evaluate the signature, e.g. $S_i$, indicated from the received reflection signal to determine the energy level of the tag, $E_i$, as shown in block 420. For example, the reader 410 may attempt to detect the tag by cross-checking between the reflection signal which the tag 130 has used and the corresponding energy level of the tag 130.

In some example embodiments, the reader 410 may determine the energy level of the tag 130 based on the reflection signal and the configuration information. In some example embodiments, the reflection signal may indicate at least a signature. In some example embodiments, the signature may indicate energy level of the tag 130.

In some example embodiments, the reader 410 may determine a signature based on the received reflection signal. For example, the signature may be defined by one or more characteristics of the reflection signal as discussed above. The configuration information may indicate, as discussed, a mapping or an association between one or more energy levels and one or more signatures. Based on the mapping or association and the determined signature of the received reflection signal, the reader 410 may determine energy level of the tag 130. For example, the determined signature may correspond to a certain energy level in the configuration information.

Then, as shown in FIG. 4, based on the the determined $E_i$, the reader 410 may detect the reflection signal from the tag 130 using different measurement methods based on the energy level of the tag. For example, the reader 410 may trigger a measurement method i based on the determined $E_1$ and perform measurement on reflection signal using measurement method i. For example, the reader 410 may activate the measurement measurement algorithm i, which is expected to ensure optimum detection of signal $S_i$. For example, if $S_i$ is associated with full tag energy level, the reader 410 may use a simple peak-detection method to estimate the distance to the tag. Conversely, if $S_i$ is associated with low tag energy, the reader 410 may trigger a measurement method that first attempts to cancel interference from the received signal.

Then, as shown in FIG. 4, the reader 410 transmits measurement report and tag's energy level $E_i$ to the network node 110 in step 422. The tag's energy level $E_i$ in step 424 may be included together in the measurement report although they are separate in FIG. 4 via for example LPP information element (IE) report. In some example embodiments, tag's energy level $E_i$ in step 424 may be transmitted as a new LPP IE report. Using the received measurement report and tag's energy level $E_i$, the network node 110 may determine next transmission session, for example, determine the periodicity and duration of next charging or activation signal and select another reader for detecting reflection signal transmitted by the tag 130.

In some example embodiments, the reader 410 may transmit capability information to the network node 110. The capability information may indicates that the reader 410 supports reflection signal detection. In some example embodiments, the network node 110 may receive, from the reader 410, capability information. Similarly, the capability information may indicate the reader 410 supports reflection signal detection.

In some example embodiments, the reflection signal may include a payload comprising at least part of data stored in the tag 130. In some example embodiments, the payload in the reflection signal may be un-encrypted when the energy level of the tag is medium, or at least part of the payload is encrypted when the energy level of the tag is full.

In some example embodiments, full energy level may correspond to energy level at 100%. Minimal energy level may correspond to the minimum energy level required by the tag 130 or a certain threshold of energy level which the tag 130 needs to reach in order to generate and/or transmit the reflection signal. Medium energy level may correspond to energy level which is lower than full energy level but at least higher than minimal energy level.

In some example embodiments, a more extensive mapping between the tag's ID, energy level, a payload of the reflection signal, and signature S of the tag may be defined. In other words, the tag 130 may reply the activation signal or transmit the reflection signal with different amount of stored information, based on its energy level. For example:

I. Tag with minimal energy level may transmit reflection signal comprising with its own ID. That is, the reflection signal may not comprise a payload. In some examples, the reflection signal may only comprise ID of the tag;

II. Tag with medium energy level may transmit with reflection signal comprising:
   i. A first part carrying ID information and implicit energy level information as described in example embodiments above: and
   ii. A second part encoding, in the signal payload, e.g., the payload of the reflection signal, a subset of stored data of the payload that does not require encryption III. Tag with full energy level may transmit with reflection signal comprising:
   i. A first part carrying both ID and implicit energy level information as described in example embodiments above: and
   ii. A second signal part encoding in the signal payload, e.g., the payload of the reflection signal:
      a. A first subset of un-encrypted data: and
      b. A second subset of encrypted data.

In some example embodiments, the reader 410 may be configured with characterization of I, II and III via a new LPP IE request.

In some example embodiments, the reader 410 may determine the energy level of the tag 130 based at least on the payload of the reflection signal from the tag 130. As discussed above, the reflection signal may comprise the payload of the reflection signal from the tag 130 and the payload may be un-encrypted or at least part of the payload is encrypted fo transmission of the reflection signal. For example, the reader 410 may determine the energy level of the tag 130 is medium when the payload of the reflection signal from the tag 130 is un-encrypted. For example, the reader 410 may determine the energy level of the tag 130 is full when at least part of the payload of the reflection signal from the tag 130 is encrypted. For example, the reader 410 may determine the energy level of the tag 130 is minimal when there is no payload in the reflection signal (i.e. the reflection signal may only comprise ID of the tag 130).

It can be seen that the method 400 proposed herein provides a signalling framework that enables the network to detect, localize and determine the energy level of a tag in a communication environment supporting IoT devices. The advantages of the proposed method may be as follow:

- Optimized tag discovery time and signalling overhead;
- Optimized tag positioning estimation by tag activator proximity optimization;
- Optimize spectral resource usage;
- Minimize network complexity and configurations;
- Power optimization at tag side relative to available energy; and
- Power optimization at the reader side, for example, simple detection for high power response.

In some example embodiments, an apparatus capable of performing any of operations of the method 200 (for example, the terminal device 120) may include means for performing the respective steps of the method 200. The means may be implemented in any suitable form. For example, the means may be implemented in a circuitry or software module.

In some example embodiments, the apparatus may comprise means for receiving, from a tag such as the tag 130, a reflection signal. The reflection signal may be indicative of at least energy level of the tag. The reflection signal may be a signal transmitted by the tag in response to or based on a stimulus signal, e.g. activation signal received by the the tag. Alternatively, the reflection signal may be a signal transmitted by the tag when the tag's energy level reaches a certain threshold. This may be applicable for a case which the tag harnesses energy from any activator device or energy source (e.g. photo taking, thermo, piezo or electromagnetic).

In some example embodiments, the reflection signal may be an interrogation response signal from the tag. The interrogation response signal may be indicative of at least energy level of the tag. In some example embodiment, the reflection signal may comprise a transmission of a signal that is responsive to an interrogation signal received by the tag. The signal may be indicative of at least energy level of the tag. The interrogation signal may be a stimulus signal, e.g. activation signal to activate the tag.

In some example embodiments, the energy level of the tag may indicate, associate with, or correspond to energy or amount of energy stored or available in the tag. For example, the energy or the amount of energy stored or available in the tag may correspond to a current energy level of the tag before transmitting a reflection signal. For example, the energy or the amount of energy stored or available in the tag may correspond to a current energy level of the tag during transmitting a reflection signal. For example, the energy or the amount of energy stored or available in the tag may correspond to a current energy level of the tag after transmitting a reflection signal.

In some example embodiments, the energy level of the tag may be expressed in terms of full charge for the tag. Alternatively, the energy level of the tag may be an absolute value expressed in Watt or milliWatt (mW). Optionally or alternatively, the energy level may be percentage of capacity of the communication device, for example one energy level may correspond to 30%-50% of the capacity, and the capacity of the communication device may be reported or known by the network node. The energy level of the tag may be increased by charging the tag using an activation signal received by the tag. The energy level of the tag may be increased by energy harvesting at the tag from energy sources such as, for example, photo taking, thermo, piezo or electromagnetic. The energy level of tag may decrease due to e.g. generation of a reflection signal.

One or more energy level may be predefined or configured by the network node. If the energy level is configured by the network node, some specific signalling will be used for the configuration, include but not limited to for example radio resource control (RRC), or any layer 2 signalling.

In some example embodiments, the apparatus may comprise means for obtaining configuration information. The configuration information may comprise at least one of the following: at least one identifier (ID) of the tag, at least one signature, and/or at least one energy level associated with the signature. The signature may be in a form of signal characteristic, e.g., waveform, time-frequency resources in which the wave is sent, modulation order, code, etc. The signature, e.g. $S_i$, may define bandwidth $B_i$, carrier frequency $f_i$ and sampling rate $fs_i$, which carries a Zadoff-Chu sequence of root $r_i$, and length $L_i$. In other words, the signature may be the necessary and/or minimum set of parameters required to generate the reflection signal.

In some example embodiments, the means for obtaining configuration information may include means for receiving the configuration information from the network node, or means for obtaining preconfigured configuration information in the terminal device or pre-defined configuration information. For example, the 3GPP specifications may define multiple sequences or signatures which are associated with different energy levels for the tag. For this case, the network node may only need to transmit tag's ID to terminal device. In some example embodiments, the apparatus may comprise means for receiving the configuration information in a long term evolution, LTE, positioning protocol, LPP.

In some example embodiments, the configuration information may indicate implicit energy level information which may correspond to mapping between the energy level and at least one signature. For example, the tag may be configured or pre-configured with identifier (ID) X. The tag with X may be configured with a set of signatures $\{S_1, \ldots, S_K\}$ in which each energy level $E_i$ (which means energy level with index i) may be mapped to $S_i$ (which means signature with index i), for example, $E_1$ maps to $S_1$ and $E_K$ maps to $S_K$. In some example embodiments, a mapping between $E_i$ and $S_i$ above may be predefined. For example standard defines the mapping between energy level $E_i$ and the signature $S_i$, and the tag may be preconfigured with the mapping.

In some example embodiment, the terminal device may be configured to detect tag with ID, e.g. X, via a new information element (IE) request from the network node 110. The new IE request may be based on LPP, for example, LPP IE request.

In some example embodiment, the apparatus may comprise means for determining the energy level of the tag based on the reflection signal and the configuration information. In some example embodiments, the reflection signal may indicate at least a signature. In some example embodiments, the signature may indicate energy level of the tag. For example, the terminal device may evaluate a signature, e.g. $S_i$, indicated from the received reflection signal to determine the energy level of the tag, e.g. $E_i$. For example, the terminal device 120 may attempt to detect the tag by cross-checking between the signature which the tag 130 has used and the corresponding energy level of the tag.

In some example embodiment, the apparatus may comprise means for determining a signature based on the received reflection signal. For example, the signature may be defined by one or more characteristics of the reflection signal as discussed above. The configuration information may indicate, as discussed, a mapping or an association between one or more energy levels and one or more signatures. Based on the mapping or association and the determined signature of the received reflection signal, the terminal device may determine energy level of the tag. For example, the determined signature may correspond to a certain energy level in the configuration information.

In some example embodiment, the apparatus may comprise means for transmitting, by the terminal device, capability information to the network node. The capability information may indicate at least the terminal device may support reflection signal detection. By receiving the capability information, the network node may configure and/or transmit configuration information to the corresponding terminal device so that the terminal device may perform the determining of a signature and/or energy level of the tag as discussed above.

In some example embodiments, the reflection signal may comprise at least a payload including at least part of data stored in the tag. The data may refer to data which the tag may be required to collect, store and/or transmit, such as the values of humidity (e.g. in terms of a percentage of relative humidity), pressure (e.g. in Pascal), temperature (e.g. in Celsius, Kelvin or Fahrenheit) etc. and the timestamps (e.g. in date and time up to seconds or miliseconds) in which the values are collected. The data may be stored in the tag for transmission.

In some example embodiments, the payload of the tag may be un-encrypted or encrypted based on the energy level indicated by the reflection signal. In some example embodiments, the payload may be un-encrypted when the energy level of the tag is medium. In some example embodiments, at least part of the payload may be encrypted when the energy level of the tag is full.

In some example embodiments, full energy level may correspond to energy level at 100%. Minimal energy level may correspond to the minimum energy level required by the tag or a certain threshold of energy level which the tag needs to reach in order to generate and/or transmit the reflection signal. Medium energy level may correspond to energy level which is lower than full energy level but at least higher than minimal energy level.

In some example embodiments, a more extensive mapping between the tag's ID, energy level, a payload of the reflection signal, and signature S of the tag may be defined. In other words, the tag may reply the activation signal or transmit the reflection signal with different amount of stored information, based on its energy level. In some example embodiments, the terminal device may be configured with the mapping between the tag's ID, energy level, a payload of the reflection signal, and signature S of the tag via, for example, a new LPP IE request.

In some example embodiment, the apparatus may comprise means for determining the energy level of the tag based at least on the payload of the reflection signal from the tag. As discussed above, the reflection signal may comprise the payload and the payload may be un-encrypted or at least part of the payload is encrypted. For example, the terminal device may determine or consider the energy level of the tag is medium when the payload of reflection signal from the tag is un-encrypted. For example, the terminal device may determine the energy level of the tag is full when at least part of the payload of the reflection signal from the tag is encrypted. For example, the terminal device may determine the energy level of the tag is minimal when there is no payload in the reflection signal (i.e. the reflection signal may only comprise ID of the tag).

In some example embodiment, the apparatus may comprise means for detecting the reflection signal from the tag using different measurement methods based on the energy level of the tag. For example, the terminal device may trigger measurement method i based on the determined $E_i$ and perform measurement on reflection signal using measurement method i. For example, the terminal device may activate the measurement algorithm i, which is expected to ensure optimum detection of signal $S_i$. For example, if $S_i$ is associated with full tag energy level, the terminal device may use a simple peak-detection method to estimate the distance to the tag. Conversely, if $S_i$ is associated with low tag energy, the terminal device may trigger a measurement method that first attempts to cancel interference from the received signal.

In some example embodiment, the apparatus may further comprise means for indicating, to the network node, the energy level of the tag. The energy level may indicate, associate with, or correspond to energy or amount of energy stored or available in the tag. As discussed above, the energy level of the tag may be determined, by the terminal device, based on e.g. received reflection signal and the configuration information.

In some example embodiment, the apparatus may comprise means for transmitting, to the network node, energy information of the tag via a report, for example. The report may indicate or comprise at least the energy information of the tag. The energy information may indicate at least energy level of the tag. For example, the report may be transmitted together in a measurement report via LPP IE report. In some example embodiments, the report may be transmitted as a new LPP IE report.

In some example embodiments, the apparatus may further comprise means for performing other steps in some embodiments of the method 200. In some example embodiments, the means comprises at least one processor and/or at least one memory including computer program code. The at least one memory and computer program code are configured to, with the at least one processor, cause the performance of the apparatus.

In some example embodiments, an apparatus capable of performing any of the method 300 (for example, the network node 110) may include means for performing the respective steps of the method 300. The means may be implemented in any suitable form. For example, the means may be implemented in a circuitry or software module.

In some example embodiments, the apparatus may comprise means for transmitting, by the network node, an activation signal to the tag. The activation signal may be used to activate the tag. The activation of the tag may comprise that the tag generates and/or transmits a reflection signal in response of the activation signal. The network node may not transmit activation signal directly to the tag, it may command/request another user device sending activation signal to the tag. It should be understand that the network node may transmit or indicate another user device (which is called activator device) to transmit an activation signal to the tag.

In some example embodiments, the apparatus may comprise means for transmitting configuration information to the terminal device. The configuration information may comprise at least one of the following: at least one identifier (ID) of the tag, at least one signature, and/or at least one energy level associated with the signature. In some example embodiments, the configuration information may be transmitted in a long term evolution, LTE positioning protocol, LPP.

In some example embodiments, the configuration information may indicates mapping between the energy level and at least one signature. For example, the tag may be configured or pre-configured with ID X. The tag with X may be configured with a set of signatures $\{S_1, \ldots, S_K\}$ in which each energy level $E_i$ (which means energy level with index i) maps to $S_i$ (which means signature with index i), for example, $E_1$ maps to $S_1$ and $E_K$ maps to $S_K$. In some example embodiments, a mapping between $E_i$ and $S_i$ above may be predefined. For example standard defines the mapping between energy level $E_i$ and the signature $S_i$, and the tag may be preconfigured with the mapping.

In some example embodiments, the apparatus may comprise means for configuring terminal device to detect the tag with ID X via a new information element (IE) request. The new IE request may be based on LPP, for example, LPP IE request.

In some example embodiments, the apparatus may comprise means for receiving, from the terminal device, capability information. The capability information may indicate that the terminal device may support reflection signal detection over a relection signal from the tag.

In some example embodiments, the apparatus may comprise means for receiving, from the terminal device, information indicating at least energy level of the tag. The energy level may indicate, associate with, or correspond to energy or amount of energy stored or available in the tag, as discussed above. The information may be received as an IE.

In some example embodiments, the apparatus may comprise means for receiving, from the terminal device, energy information via a report. The report includes at least the energy information. The energy information may indicate at least energy level of the tag. The report may be received together in a measurement report via LPP IE report. In some example embodiments, the report may be received as a new LPP IE report.

In some example embodiments, the apparatus may further comprise means for performing other steps in some embodiments of the method 300. In some example embodiments, the means comprises at least one processor and at least one memory including computer program code. The at least one memory and computer program code are configured to, with the at least one processor, cause the performance of the apparatus.

Figure 5:
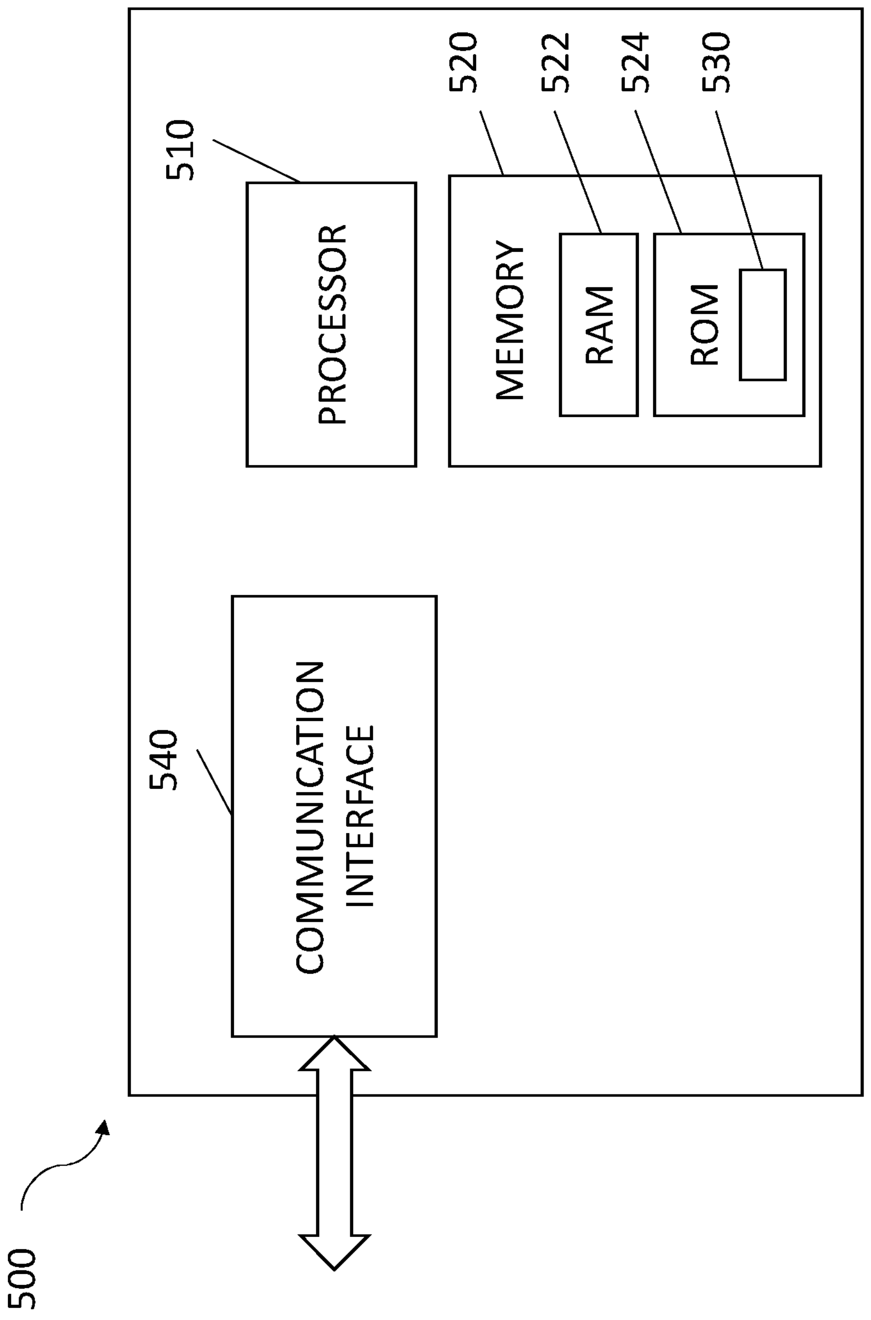
FIG. 5 illustrates an example simplified block diagram of a device that is suitable for implementing embodiments of the present disclosure.

FIG. 5 is a simplified block diagram of a device 500 that is suitable for implementing embodiments of the present disclosure. The device 500 may be provided to implement the communication device, for example the terminal device 120 or the network node 110 as shown in FIG. 1. As shown, the device 500 includes one or more processors 510, one or more memories 520 may be coupled to the processor 510, and one or more transmitters and/or receivers (TX/RX) coupled to the processor 510. The one or more transmitters and/or receivers (TX/RX) may be referred as communication interface 540 in FIG. 5.

The communication interface 540 may be for bidirectional communications. The communication interface 540 may have at least one antenna to facilitate communication. The communication interface may represent any interface that is necessary for communication with other network elements. The communication interface may be hardware or software based interface. For example, the communication interface may be one ore more transceivers. The one or more transceivers may be coupled to one or more antennas or antenna ports to wirelessly transmit and/or receive communication signals. The antennas or antenna ports may be the same or different types. The antennas or antenna ports may be located in different positions of an apparatus. The one or more transceivers allow the apparatus to communicate with other devices that may be wired and/or wireless. The transceiver may support one or more radio technologies. For example, the one or more transceivers may include a cellular subsystem, a WLAN subsystem, and/or a Bluetooth™ subsystem. The one or more transceivers may include processors, controllers, radios, sockets, plugs, buffers, or the like circuits to form one or more communication channels to one or more radio frequency units.

The processor 510 may be of any type suitable to the local technical network and may include one or more of the following: general purpose computers, special purpose computers, microprocessors, digital signal processors (DSPs) and processors based on multicore processor architecture, as non-limiting examples. The device 500 may have multiple processors, such as an application specific integrated circuit chip that is slaved in time to a clock which synchronizes the main processor.

The memory 520 may include one or more non-volatile memories and one or more volatile memories. Examples of the non-volatile memories include, but are not limited to, a read only memory (ROM) 524, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 522 and other volatile memories that will not last in the power-down duration.

A computer program 530 includes computer executable instructions that may be executed by the associated processor 510. The program 530 may be stored in the ROM 524. The processor 510 may perform any suitable actions and processing by loading the program 530 into the RAM 522.

The embodiments of the present disclosure may be implemented by means of the program so that the device 500 may perform any process of the disclosure as discussed with reference to FIGS. 2 to 4. The embodiments of the present disclosure may also be implemented by hardware or by a combination of software and hardware.

Figure 6:
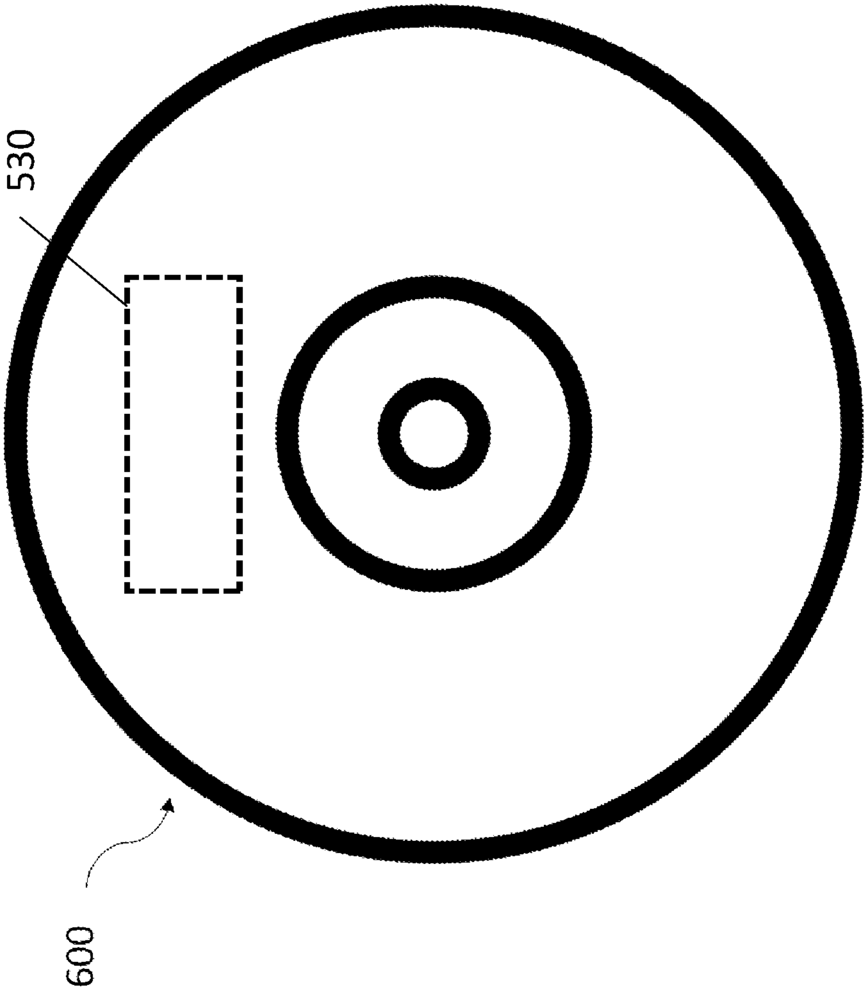
FIG. 6 illustrates an example block diagram of an example computer readable medium in accordance with some embodiments of the present disclosure.

In some embodiments, the program 530 may be tangibly contained in a computer readable medium which may be included in the device 500 (such as in the memory 520) or other storage devices that are accessible by the device 500. The device 500 may load the program 530 from the computer readable medium to the RAM 522 for execution. The computer readable medium may include any types of tangible non-volatile storage, such as ROM, EPROM, a flash memory, a hard disk, CD, DVD, and the like. FIG. 6 shows an example of the computer readable medium 600 in form of CD or DVD. The computer readable medium has the program 530 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the method 200 or 300 as described above with reference to FIG. 2 and FIG. 3. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. The term "non-transitory," as used herein, is a limitation of the medium itself (i.e., tangible, not a signal) as opposed to a limitation on data storage persistency (e.g., RAM vs. ROM).

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A terminal device, comprising:

at least one processor; and at least one memory storing instructions that, when executed by the at least one processor, cause the terminal device at least to:

receive, from a communication device, a reflection signal, wherein the reflection signal is based on a signal received by the communication device and is indicative of at least an energy level associated with energy stored in the communication device; and indicate, to a network node, the energy level of the communication device, wherein the at least one memory storing instructions are further configured to, with the at least one processor, cause the terminal device at least to:

obtain configuration information, wherein the configuration information comprises at least one of the following:

at least one identifier of the communication device, at least one signature, or at least one corresponding energy level associated with the at least one signature, wherein the configuration information indicates mapping between the energy level of the communication device and corresponding one of the at least one signature.

2. The terminal device of claim 1, wherein the obtaining the configuration information comprises:

receiving the configuration information from the network node: or obtaining preconfigured configuration information in the terminal device or pre-defined configuration information.

3. The terminal device of claim 1, wherein the at least one memory storing instructions are further configured to, with the at least one processor, cause the terminal device at least to:

determine the energy level of the communication device based at least on the reflection signal and the configuration information.

4. The terminal device of claim 3, wherein the determining the energy level of the communication device based at least on the reflection signal and the configuration information comprises:

determining a signature based on the reflection signal; and determining, based on the configuration information and the determined signature, the energy level of the communication device.

5. The terminal device of claim 1, wherein the at least one memory storing instructions are further configured to, with the at least one processor, cause the terminal device at least to:

transmit, by the terminal device and to the network node, capability information of the terminal device, wherein the capability information indicates that the terminal device supports reflection signal detection for one or more reflection signals to the terminal device.

6. The terminal device of claim 1, wherein the reflection signal includes a payload comprising at least part of data stored in the communication device, and the payload of the reflection signal is un-encrypted or at least part of the payload is un- or transmission of the reflection signal to the terminal device from the communication device.

7. The terminal device of claim 6, wherein the at least one memory storing instructions are further configured to, with the at least one processor, cause the terminal device at least to:

determine the energy level of the communication device based at least on the payload of the reflection signal from the communication device.

8. The terminal device of claim 6, wherein the energy level of the communication device is medium when the payload of the reflection signal from the communication device is un-encrypted; or the energy level of the communication device is full when at least part of the payload of the reflection signal from the communication device is un-encrypted.

9. The terminal device of claim 1, wherein the at least one memory storing instructions are further configured to, with the at least one processor, cause the terminal device at least to:

detect, based on the energy level of the communication device and using at least one measurement method, the reflection signal from the communication device.

10. A network node, comprising:

at least one processor; and at least one memory storing instructions that, when executed by the at least one processor, cause the network node at least to: transmit, by the network node, an activation signal to a communication device to activate the communication device; and receive, from a terminal device, information indicating at least an energy level associated with energy stored in the communication device, wherein the at least one memory storing instructions are further configured to, with the at least one processor, cause the network node at least to:

transmit configuration information to the terminal device, wherein the configuration information comprises at least one of the following:

at least one identifier of the communication device, at least one signature, or at least one corresponding energy level associated with the at least one signature, wherein the configuration information indicates mapping between the energy level of the communication device and corresponding one of the at least one signature.

11. The network node of claim 10, wherein the configuration information is transmitted via a long term evolution (LTE) positioning protocol (LPP).

12. The network node of claim 10, wherein the at least one memory storing instructions are further configured to, with the at least one processor, cause the network node at least to:

receive, from the terminal device, capability information, wherein the capability information indicates the terminal device supports reflection signal detection for one or more reflection signals to the terminal device.

13. A method comprising:

at a terminal device, receiving, from a communication device, a reflection signal, wherein the reflection signal is based on a signal received by the communication device and is indicative of at least an energy level associated with energy stored in the communication device; and indicating, to a network node, the energy level of the communication device, transmitting, by the terminal device and to the network node, capability information, wherein the capability information indicates that the terminal device supports reflection signal detection for one or more reflection signals to the terminal device.

14. The method according to claim 13, comprising:

obtaining, configuration information, wherein the configuration information comprises at least one of the following:

at least one identifier of the communication device, at least one signature, or at least one corresponding energy level associated with the at least one signature.

15. The method according to claim 13, wherein the reflection signal includes a payload comprising at least part of data stored in the communication device, and the payload of the reflection signal is un-encrypted or at least part of the payload is un-encrypted for transmission of the reflection signal to the terminal device from the communication device.

* * * * *